(12) United States Patent
Tokuyoshi (10) Patent No.: US 6,377,806 B1
(45) Date of Patent: Apr. 23, 2002

(54) MOBILE PHONE WITH COMMUNICATION CHANNEL SWITCHING DETERMINATING UNIT

(75) Inventor: Takaya Tokuyoshi, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/349,350

(22) Filed: Jul. 7, 1999

(30) Foreign Application Priority Data

Jul. 15, 1998 (JP) ............................................ 10-214764

(51) Int. Cl.$^7$ .................................................. H04Q 7/20
(52) U.S. Cl. ........................ 455/437; 455/436; 455/550; 370/331; 370/333
(58) Field of Search ................................. 455/422, 432, 455/436, 437, 440, 443, 513, 550; 370/331, 332, 333

(56) References Cited

U.S. PATENT DOCUMENTS

| | | |
|---|---|---|
| 5,471,671 A | 11/1995 | Wang et al. |
| 5,999,816 A * | 12/1999 | Tiedemann, Jr. et al. ... 455/437 |
| 6,021,328 A * | 2/2000 | Curtis et al. ................ 455/443 |
| 6,075,990 A * | 6/2000 | Shin ........................... 455/440 |

FOREIGN PATENT DOCUMENTS

| | | |
|---|---|---|
| EP | 0 455 614 A1 | 11/1991 |
| JP | 1-120135 | 5/1989 |
| JP | 1-183221 | 7/1989 |
| JP | 4-144429 | 5/1992 |
| JP | 8-256369 | 10/1996 |
| JP | 8-289353 | 11/1996 |
| WO | WO 98/53630 | 11/1998 |
| WO | WO 99/34627 | 7/1999 |

* cited by examiner

*Primary Examiner*—Nay Maung
(74) *Attorney, Agent, or Firm*—Scully, Scott, Murphy & Presser (57) ABSTRACT

A mobile phone includes an error detecting section and a channel switching control section. The error detecting section detects a frame error rate on a present communication of one of a plurality of base stations. The channel switching control section determines whether a communication quality is degraded, based on the detected frame error rate and a past channel switching result. Also, the channel switching control section determines that a channel switching from the present communication channel to a new communication channel should be performed, when it is determined that the communication quality is degraded.

19 Claims, 8 Drawing Sheets

Fig.1 PRIOR ART 31,32,33   RADIO ZONE

MOBILE PHONE WITH COMMUNICATION CHANNEL SWITCHING DETERMINATING UNIT

BACKGROUND OF THE INVENTION

1. Field of the Invention

The present invention relates to a mobile phone with a communication channel switching determining unit suitable for the technique in which unnecessary channel switching can be restrained.

2. Description of the Related Art

A system for a working area such as an office and a factory will be described as an example of a digital cordless phone system. The digital cordless phone system in the working area is generally operated in the system configuration shown in FIG. 1.

Figure 1:
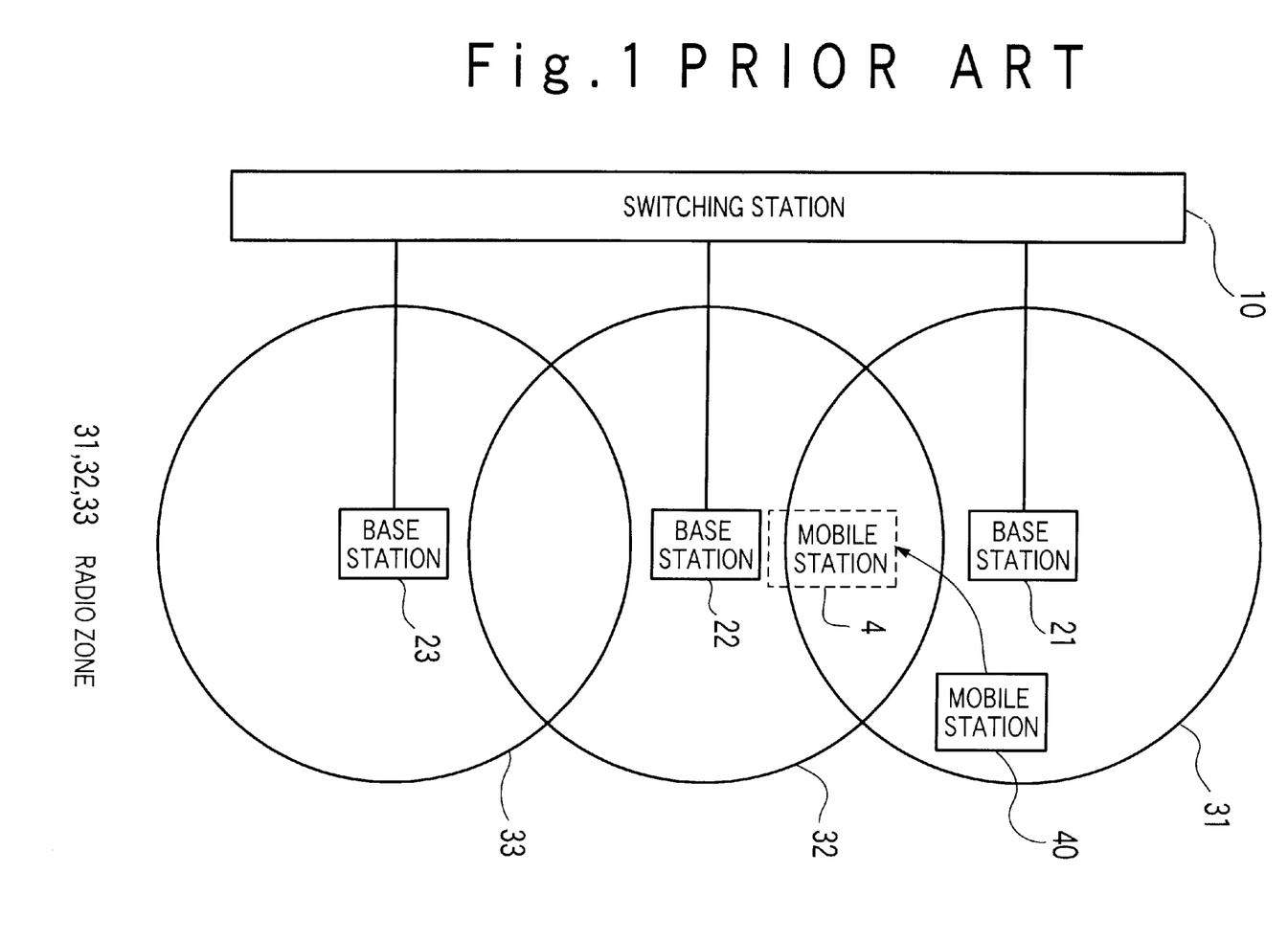
FIG. 1 is a structure diagram showing a conventional mobile phone system.

The digital cordless phone system shown in FIG. 1 is composed of a switching station 10, base stations 21 to 23 and a mobile station 40. The switching station 10 controls the base stations and the lines. Each of the base stations 21 to 23 performs a radio communication with the mobile station 40. Radio zones 31 to 33 are formed for the respective base stations 21 to 23.

In the digital cordless phone system which has such a structure, the mobile station 40 operates as follows.

Now, it is supposed that the mobile station 40 exists in the radio zone 31 of the base station 21 and it is during communication with the base station 21. As shown by an arrow in FIG. 1, when the mobile station 40 moves away from the base station 21, a reception electric field intensity in the mobile station 40 becomes low. At the same time, the frame error rate becomes high so that the communication quality degrades.

The mobile station 40 performs a channel switching determining process, when the mobile station 40 detects the degradation of the communication quality. At this time, the mobile station 40 selects as a new communication channel, either of another communication channel in the base station 21 and another communication channel in the base station 22 or 23. The communication is continued by use of the selected new communication channel.

Generally, the switching to the other communication channel of the base station for which the communication channel has been established is called a channel switching in the base station (intra-station channel switching). Also, the switching to a communication channel of the other base station is called hand-over (inter-station channel switching).

When the mobile station 40 selects the channel switching to a new communication channel in the base station as the result of the channel switching determining process, the mobile station 40 measures an interference wave to the new communication channel in the base station 21, i.e., performs carrier sense. The new communication channel with the base station 21 is established, when it is determined that the channel is usable. The communication with the base station 21 by use of a new communication channel is performed through the establishment of the new communication channel and the communication is continued.

On the other hand, when the hand-over is selected for the channel switching, the mobile station 40 first searches one of the base stations 21 to 23 having the highest one of the reception signal levels higher than a threshold value. In FIG. 1, it is supposed that the reception signal level from the base station 22 is the highest, because the mobile station 40 is positioned on a position the closest to the base station 22.

The mobile station 40 performs the establishment of synchronization with the base station 22, when the base station 22 with the highest reception electric field intensity level is searched. When the synchronization establishment succeeds, the carrier sense of the communication channel specified by the base station 22 is performed and the communication channel is established. The channel switching from the base station 21 to the base station 22 is performed as the result of the establishment of the communication channel and the communication is continued.

In a case where the mobile station moves during communication, the communication quality is degraded with the moving away of the mobile station from the base station in the communication state as described above. Also, even if the mobile station stops at a position and continues the communication, the communication quality is degraded when any interference wave against the communication channel is generated. Therefore, in such cases, the communication channel switching would become necessary.

The mobile station always monitors the frame error rate of the communication channel during the communication, and detects the degradation of the communication quality based on this frame error rate. Also, in the channel switching determining process when the degradation of the communication quality is detected, the frame error rate and the reception electric field intensity levels of the communication channel become the determination condition for the selection of a channel switching destination. That is, the communication channel switching in the mobile station is performed through the selection of the channel switching destination on the basis of the frame error rate, the communication quality degradation detection derived from the frame error rate, and the reception electric field intensity level.

However, in the above conventional technology, stable communication continuation becomes difficult, in a case where the system is installed in the factory in which an equipment is located around the system to generate the electromagnetic waves to function as any cause of the communication channel interference. In this case, the communication quality degradation is detected and the mobile station repeats the channel switching frequently under the environment in which the interference wave is generated from the equipment in an impulse manner to interfere with the radio communication channel.

As described above, in the channel switching, a communication channel is established after the carrier sense of the switched channel is performed. However, in case that an interference wave is not a continuous manner but an impulse manner, the channel establishment sometimes fails due to the interference wave generated when the communication channel is established, even if it is determined at the time of the carrier sense that the interference wave is not present. Especially, when a hand-over process occurs frequently for the channel switching, the establishment of the synchronization sometimes fails due to the interference wave generated in an impulse manner. As a result, it becomes more difficult to provide the stable communication due to the frequent occurrence of interference such as the communication breaking-off. Therefore, the channel switching operation should be restrained to the degree that the minimum communication quality can be secured, under the environment in which the synchronization establishment and the communication channel establishment are difficult.

In this case, the communication breaking-off can be prevented so that the communication is possible to be stabilized.

In conjunction with the above description, a radio channel switching system in a mobile station is described in Japanese Laid Open Patent Application (JP-A-Heisei 1-120135). In this reference, when the degradation of communication quality is detected while a mobile station communicates with a radio base station using a first radio channel, the mobile station selects another base station to establish a second radio channel. Then, the mobile station transmits a data signal through said first and second radio channels while said first and second radio channels are alternately switched for a switching transmission and reception time interval. The mobile station switches a use radio channel from the first radio channel to the second radio channel, after the communication quality is confirmed in the second radio channel. In this case, the same channel is used in a time divisional manner to prevent the interference to another mobile station which using the same channel.

Also, a mobile communication station is described in Japanese Laid Open Patent Application (JP-A-Heisei 1-183221). In this reference, a check of a new communication channel is performed as follows. While a communication is performed using a time divisional multiple communication channel, a frequency is switched to a new frequency for the new communication channel after a time slot of the communication channel is ended. The channel is again switched to the communication channel when the check of the new communication channel is ended or when a predetermined time interval elapses.

Also, a mobile communication channel switching control system is described in Japanese Laid Open Patent Application (JP-A-Heisei 4-144429). In this reference, a plurality of base stations form radio zones. When a mobile station moves between the plurality of radio zones, the mobile station can continue the communication by referring to a peripheral base station zone table which indicates destination base stations and by switching a channel to a new channel for a selected one of the destination base stations. The selected destination base station satisfies a predetermined channel switching condition. At this time, a priority level is allocated to each of the destination base stations, and one of the destination base stations is selected to satisfy the predetermined channel switching condition in accordance with the priority levels.

Also, a communication switching system in a mobile communication system is described in Japanese Laid Open Patent Application (JP-A-Heisei 8-256369). In this reference, a mobile station (21) performs connection of a communication channel to a destination base station (12) using a time slot which is not used for the communication with a source base station (11). Then, the mobile station switches the communication channel from the channel to the source base station (12) to the channel to the destination base station (12), and then release the channel to the source base station (12). At the same time, a communication path to a counter station (31) is connected to the source and destination base stations (11 and 12), and then the communication path connected to the source base station (11) is released.

Also, a control channel switching system is described in Japanese Laid Open Patent Application (JP-A-Heisei 8-289353). In this reference, a TDMA-MCA system radio communication system has a (m×n) channel structure which has m carriers different in frequency and one carrier is divided into n time slots. When a failure occurs in a current communication channel as the control channel (S1), the control channel is shifted to a communication channel which is not used for communication (S3). If it is impossible, after the disconnection of the communication channel and the automatic re-connection are informed previously (S5), the communication channel is disconnected and the control channel is shifted to the communication channel (S6). A call for the disconnected communication channel is allocated to the head of a connection queue for the re-connection (S7). Thereafter, the call of the disconnected communication channel is connected to the channel in which the communication is ended (S8 and S9).

SUMMARY OF THE INVENTION

An object of the present invention is to provide a mobile phone in which communication can be stabilized.

Another object of the present invention is to provide a mobile phone in which channel switching can be restrained such that communication is stabilized.

Still another object of the present invention is to provide a mobile phone in which communication is stabilized, even in the environment in which an interference wave to a communication channel is frequently generated.

In order to achieve an aspect of the present invention, a mobile phone includes an error detecting section and a channel switching control section. The error detecting section detects a frame error rate on a present communication of one of a plurality of base stations. The channel switching control section determines whether a communication quality is degraded, based on the detected frame error rate and a past channel switching result. Also, the channel switching control section determines that a channel switching from the present communication channel to a new communication channel should be performed, when it is determined that the communication quality is degraded.

The channel switching control section may determine a frame error rate threshold value based on the past channel switching result, and compare the detected frame error rate and the determined frame error rate threshold value. Then, the channel switching control section may determine that the communication quality is degraded when the detected frame error rate is equal to or larger than the determined frame error rate threshold value. In this case, the channel switching control section may set a first threshold value as the determined frame error rate threshold value, when the past channel switching result indicates that a success rate of past channel switching operations is equal to or higher than a success rate threshold value. Also, the channel switching control section may set a second threshold value as the determined frame error rate threshold value when the past channel switching result indicates that the success rate of the past channel switching operations is lower than the success rate threshold value. Here, the second threshold value is larger than the first threshold value. The past channel switching operations may be hand-over operations, or intra-station channel switching operations.

The channel switching control section may calculate the success rate of the past channel switching operations, when the past channel switching operation is executed a predetermined number of times.

The channel switching control section may set one of first and second threshold values as the determined frame error rate threshold value based on the past channel switching result. Here, the second threshold value is larger than the first threshold value. In this case, the past channel switching result may include a first success rate of hand-over operations and a second success rate of intra-station channel switching operations. The second threshold value is preferably set when the first success rate is lower than a first success rate threshold value, or when the first success rate is equal to or higher than the first success rate threshold value but the second success rate is lower than a second success rate threshold value. Also, the first threshold value is preferably set when the second success rate is equal to or higher than the second success rate threshold value. The channel switching control section may calculate the first success rate when a hand-over operation is executed a first predetermined number of times, and the second success rate when an intra-station channel switching operation is executed a second predetermined number of times.

The mobile phone may further include an intensity detecting section detecting reception electric field intensities from signals received from the plurality of base stations. At this time, the channel switching control section may determine whether a hand-over process or an intra-station channel switching operation should be performed, based on the detected reception electric field intensities, when it is determined that the channel switching should be performed.

Also, the mobile phone may further includes an intensity detecting section detecting reception electric field intensities from signals received from the plurality of base stations. In this case, the channel switching control section includes a channel switching determining section, a setting section and a state monitoring section. The channel switching determining section determines whether the communication quality is degraded, based on the detected frame error rate and a frame error rate threshold value. Also, the channel switching determining section determines that the channel switching from the present communication channel to the new communication channel should be performed based on a channel switching method, when it is determined that the communication quality is degraded. The setting section selecting one of a first threshold value and a second threshold value as the frame error rate threshold value in response to the past channel switching result to set to the channel switching determining section. Here, the first threshold value is smaller than the second threshold value. The state monitoring section monitors results of past channel switching operations to output the past channel switching result to the setting section. In this case, the channel switching determining section determines that the communication quality is degraded, when the detected frame error rate is equal to or larger than the frame error rate threshold value. Also, the channel switching determining section determines which of a hand-over process or an intra-station channel switching process should be performed, based on the detected reception electric field intensities, when it is determined that the communication quality is degraded.

The state monitoring section monitors a success rate of the hand-over processes, and determines whether a hand-over failure does not occur frequently, based on the hand-over success rate and a success rate threshold value. Also, the state monitoring section outputs the past channel switching result to the setting section based on the determining result of whether a hand-over failure does not occur frequently. In this case, the setting section selects the second threshold value as the frame error rate threshold value, when it is determined by the state monitoring section that the hand-over failure occurs frequently. Also, the setting section sets the first threshold value as the frame error rate threshold value, when it is determined by the state monitoring section that the hand-over failure does not occurs frequently. The second threshold value is set to a value in a range with an upper limit value such that a communication can be performed on the present communication channel at least.

Also, the state monitoring section sets the success rate of the hand-over processes is increased, when synchronization with a destination one of the plurality of base stations is established at once hand-over process.

The state monitoring section includes a hand-over monitoring section monitoring an execution result of the hand-over process, and an intra-station channel switching monitoring section monitoring an execution result of the intra-station channel switching process. The state monitoring section outputs at least one of the execution result of the hand-over process and execution result of the intra-station channel switching as the past channel switching result.

In this case, the hand-over monitoring section may monitor a number of times of execution of the hand-over process and the execution result of the hand-over process. Also, the hand-over monitoring section may calculate the success rate of the hand-over processes after a predetermined number of times of the execution of the hand-over process, and determine whether or not the hand-over process occurs frequently. Also, the intra-station channel switching monitoring section may monitor a number of times of execution of the intra-station channel switching process and a communication channel establishment result in the intra-station channel switching process. Then, the intra-station channel switching monitoring section may calculate a communication channel establishment success rate after a predetermined number of times of the execution of the intra-station channel switching process, and determine whether or not the communication channel is successfully established.

DESCRIPTION OF THE PREFERRED EMBODIMENTS

Hereinafter, a mobile phone with a channel switching determining unit of the present invention will be described with reference to the attached drawings.

Figure 2:
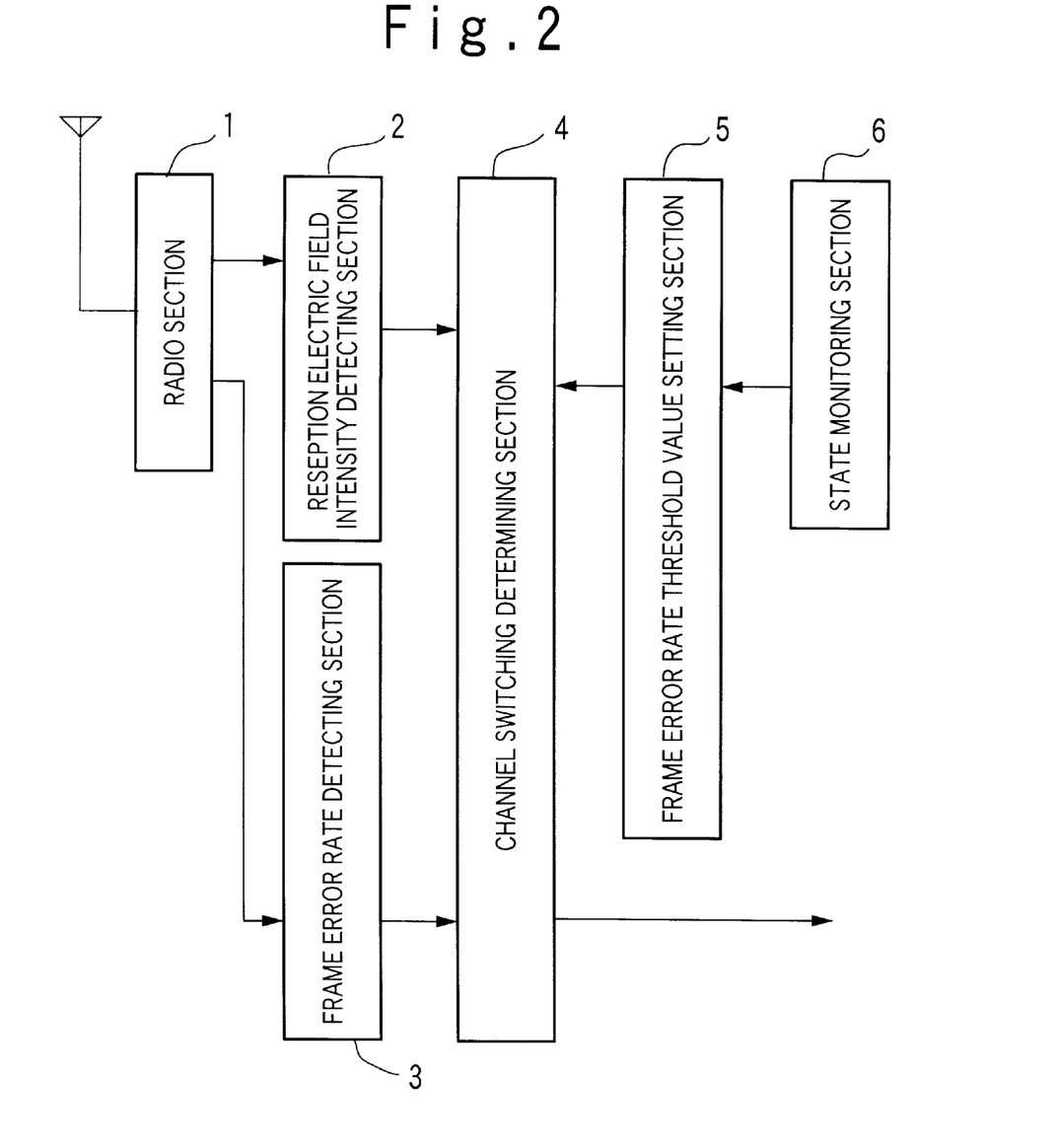
FIG. 2 is a block diagram showing the structure of a mobile phone according to a first embodiment of the present invention.

FIG. 2 is a block diagram showing the structure of the mobile phone with the channel switching determining unit according to the first embodiment of the present invention. Referring to FIG. 2, the mobile station according to the first embodiment is composed of a radio section 1, a reception electric field intensity detecting section 2, a frame error rate detecting section 3, a channel switching determining section 4, a frame error rate threshold value setting section 5, a state monitoring section 6 and a channel switching executing section (not shown). The radio section 1 performs a radio communication with a base station. The reception electric field intensity detecting section 2 detects reception electric field intensities of a received signals by the radio section 1 from the base stations. The frame error rate detecting section 3 detects a frame error rate based on the receive signal. The channel switching determining section 4 determines a channel switching method when the degradation of communication quality is detected. The frame error rate threshold value setting section 5 sets to said channel switching determining section 4, a frame error rate threshold value as the condition used to detect the degradation of the communication quality. The state monitoring section 6 monitors the result of the channel switching operation.

These sections operate as follows, respectively.

The channel switching determining section 4 compares a frame error rate detected by the frame error rate detecting section 3 for a predetermined time interval and the threshold value set by the setting section 5. When the detected frame error rate is equal to or higher than the threshold value, the channel switching determining section 4 determines to be the degradation of the communication quality. Then, the channel switching determining section 4 compares a reception electric field intensity threshold value and the reception electric field intensity detected by the reception electric field intensity detecting section 2. As a result, the channel switching determining section 4 determines as the channel switching method, a communication channel switching process in the same base station with which the current communication channel is established, when the reception electric field intensity is equal to or higher than the reception electric field intensity threshold value. Also, the channel switching determining section 4 determines as the channel switching method, a hand-over process to another base station when the reception electric field intensity is lower than the reception electric field intensity threshold value. The channel switching executing section executes the channel switching based on the determined channel switching method.

The frame error rate threshold value setting section 5 has two kinds of threshold values. One of them is a threshold value for a usual use and the other is a threshold value for the restraint of the channel switching operation which is set to restrain unnecessary channel switching operations due to the influence of the interference wave. The frame error rate threshold value setting section 5 sets the usual threshold value as the frame error rate threshold value when it is informed from the state monitoring section 6 that the hand-over failure does not occur frequently. Also, the frame error rate threshold value setting section 5 sets the threshold value for the channel switching operation restraint as the frame error rate threshold value when it is reported when the hand-over failure occurs frequently.

The state monitoring section 6 detects the number of times of execution of the hand-over process and an execution result for every execution of the hand-over process. The state monitoring section 6 calculates a hand-over success rate from the detected result when the number of times of the execution reaches a predetermined value, and determines whether or not the hand-over failure does not occur frequently.

As such, the respective channel switching operations will be described below. Here, the radio section 1, the reception electric field intensity detecting section 2 and the frame error rate detecting section 3 in FIG. 2 are well known to a skilled person in the art.

In this way, the existence or non-existence of the influence of an interference wave in case of the operation is determined based on the results of the channel switching operation performed in the past by the mobile station. As the result, the channel switching operation having the possibility of failure due to the influence of the interference wave can be restrained, because the frame error rate threshold value as the communication quality degradation determining condition is set to the appropriate value. Therefore, it is possible to avoid the instability of communication in the generation of the interference wave.

Next, the operation of the whole apparatus according to the first embodiment will be described in detail with reference to the flow charts of FIG. 2 and FIG. 3.

First, the channel switching determining process is started in a communication state. In the frame error rate threshold value setting section 5, the determination result of the channel switching operations in the past informed from the state monitoring section 6 is confirmed (a step A101 of FIG. 2).

The channel switching restraint threshold value Eb is set as the frame error rate threshold value Et if the hand-over failure occurs frequently (Step A102). Also, the usual use threshold value Ea is set as the frame error rate threshold value Et, if not the hand-over failure does not occur frequently (Step A103).

Next, in the channel switching determining section 4, the frame error rate E detected by the frame error rate detecting section 3 and the frame error rate threshold value Et set in the step A102 or step A103 are compared with each other (Step A104). If $E \geq Et$, it is determined that the communication quality is degraded and a communication quality degradation count Q is incremented (Step A105). Also, if $E<Et$, it is determined that there is not degradation of the communication quality. In this case, the communication quality degradation count Q is not incremented.

This summing process is repeated a predetermined number of times N (Step A106), and then the communication quality degradation count Q after the summing process is compared with a communication quality degradation count threshold value Qt (Step A107). If $Q \geq Qt$, it is determined that the communication channel switching operation is necessary because of the degradation of the communication quality. Subsequently, the reception electric field intensity detected for the current communication channel by the reception electric field intensity detecting section 2 is compared with the reception electric field intensity threshold value Rt to determine a channel switching method (Step A108). If $Q<Qt$, the degradation of the communication quality is determined not to be present, the communication quality degradation count Q is cleared (Step A111). Thereafter, the channel switching determining process is ended.

If the comparing result in the step A108 indicates to be $R<Rt$, the hand-over (inter-station channel switching) process is selected as the channel switching method (Step A109). On the other hand, if $R \geq Rt$, the channel switching process in the base station (intra-station channel switching process) is selected as the channel switching method (Step A110). After the channel switching method is determined, the communication quality degradation count Q is cleared (Step A111). This is shown in FIG. 4. Then, the channel switching determining process is ended. Thereafter, the channel switching is executed by the channel switching executing section (not shown).

Next, a specific example will be described with reference to FIG. 5.

Figure 5:
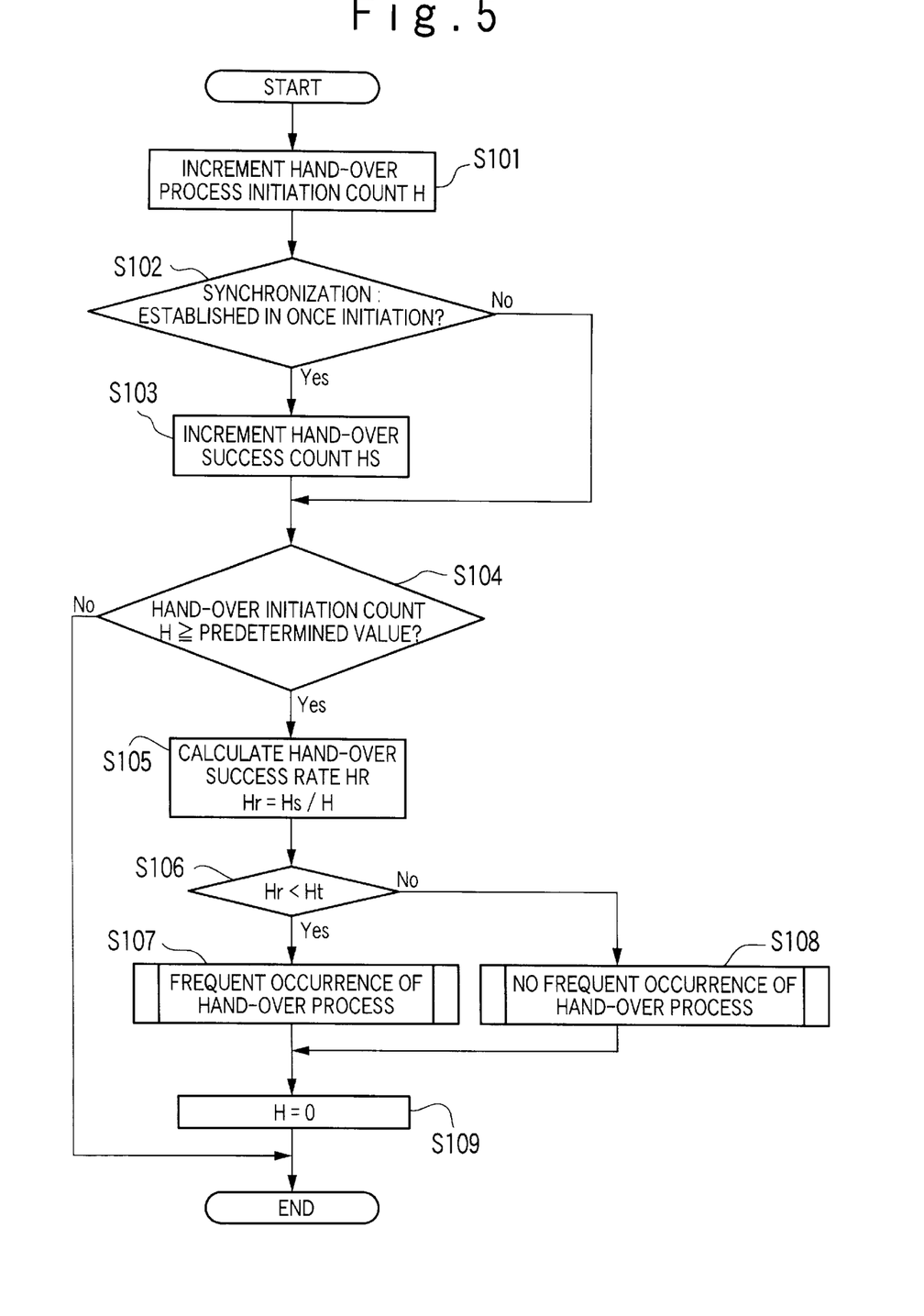
FIG. 5 is a flow chart showing a specific example of the operation of the mobile phone according to the first embodiment of the present invention.

As shown in FIG. 5, the two kinds of frame error rate threshold values Ea and Eb as the communication quality degradation detection conditions have been set to satisfy Eb>Ea. As a result, the channel switching operation can be restrained in the case that the channel switching restraint threshold value Eb is used, compared with the case that the usual use threshold value Ea is used. Thus, the number of channel switching operations can be reduced even when the frame error rate is increased due to the interference wave which is generated frequently.

In this way, it becomes difficult to detect the communication quality degradation in the case that the frame error rate threshold value Et is set as the threshold value Eb than in the case that it is set as the threshold value Ea. However, the threshold value Eb is set to a value such that the minimum communication can be provided in the same communication channel. The reception electric field intensity threshold value Rt is set to the reception electric field intensity such that the stable communication state can be provided in the minimum in the same base station.

The operation of the state monitoring section 6 is performed as shown in FIG. 5.

First, when the hand-over operation is executed, a hand-over initiation count H is incremented (a step S101 of FIG. 4). The hand-over initiation count H is incremented every time the hand-over operation is executed. Next, the establishment of the synchronization at the time of the hand-over operation is confirmed to check the executing result of the hand-over operation (Step S102). When the establishment of the synchronization with a destination base station succeeds in a once hand-over operation, it is determined to be the success of the hand-over operation and the hand-over success count Hs is incremented (Step S103). On the other hand, the establishment of the synchronization sometimes fails in the hand-over operation in the environment in which the interference wave generates in an impulse manner.

Therefore, when the establishment of the synchronization in the hand-over destination does not succeed at once, it is determined that the hand-over failure occurs due to the interference wave, and the hand-over execution result measuring process is ended without incrementing the hand-over success count Hs. This measuring process is performed every time hand-over operation is executed. When the hand-over initiation count H reaches a predetermined value (Step S104), the hand-over success rate Hr (=Hs/H) is calculated (Step S105). Then, the hand-over success rate Hr is compared with the hand-over success rate threshold value Ht (Step S106).

If Hr<Ht, it is determined that the hand-over failure occurs frequently due to the influence of the interference wave (Step S107). Also, if Hr≧Ht, it is determined that the hand-over failure does not occur frequently due to the influence of the interference wave (Step S108). Lastly, the hand-over initiation count H is cleared (Step S109). Thereafter, the step A101 of FIG. 3 is executed.

Figure 3:
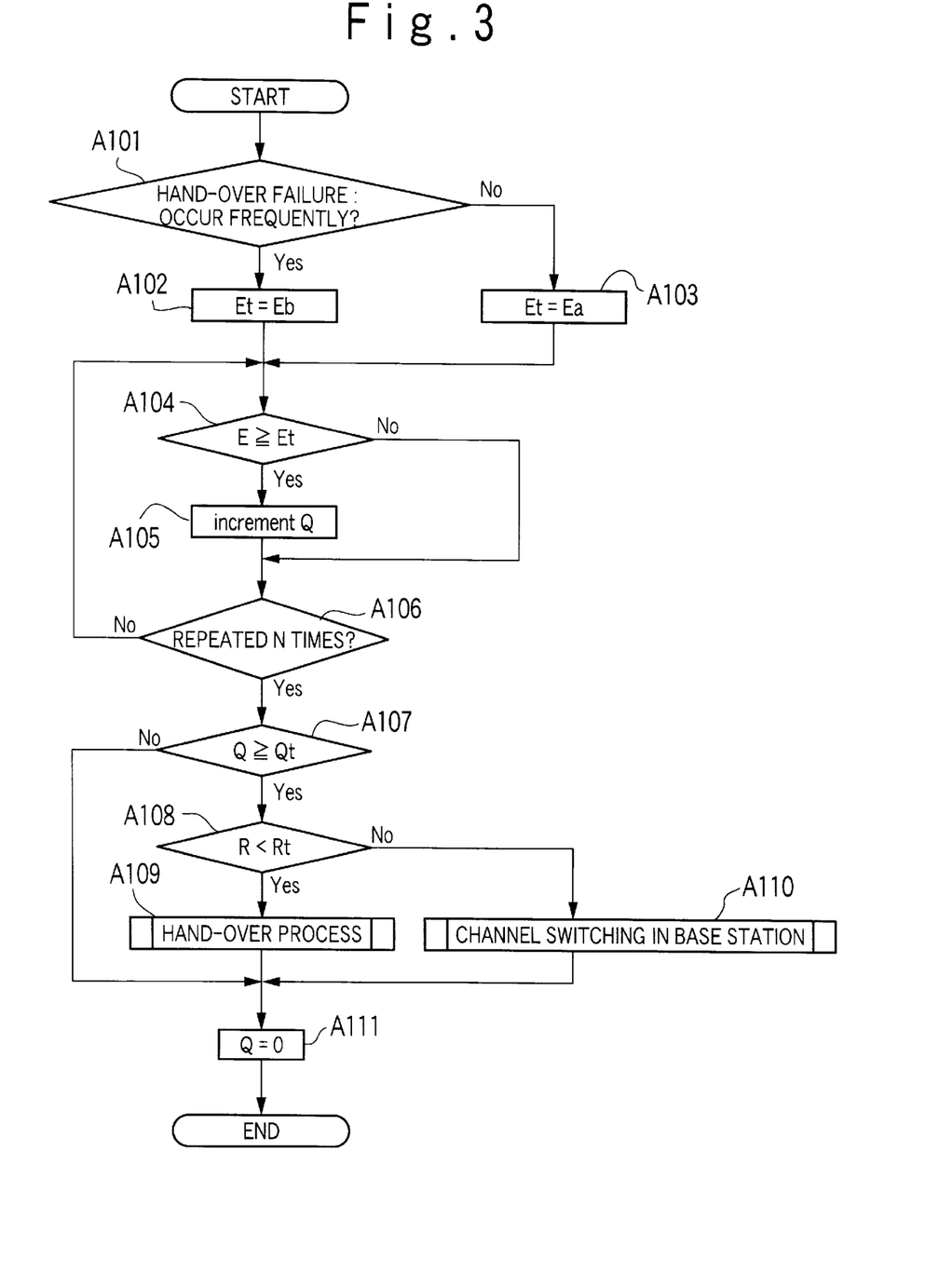
FIG. 3 is a flow chart showing the operation of the mobile phone according to the first embodiment of the present invention.
Figure 4:
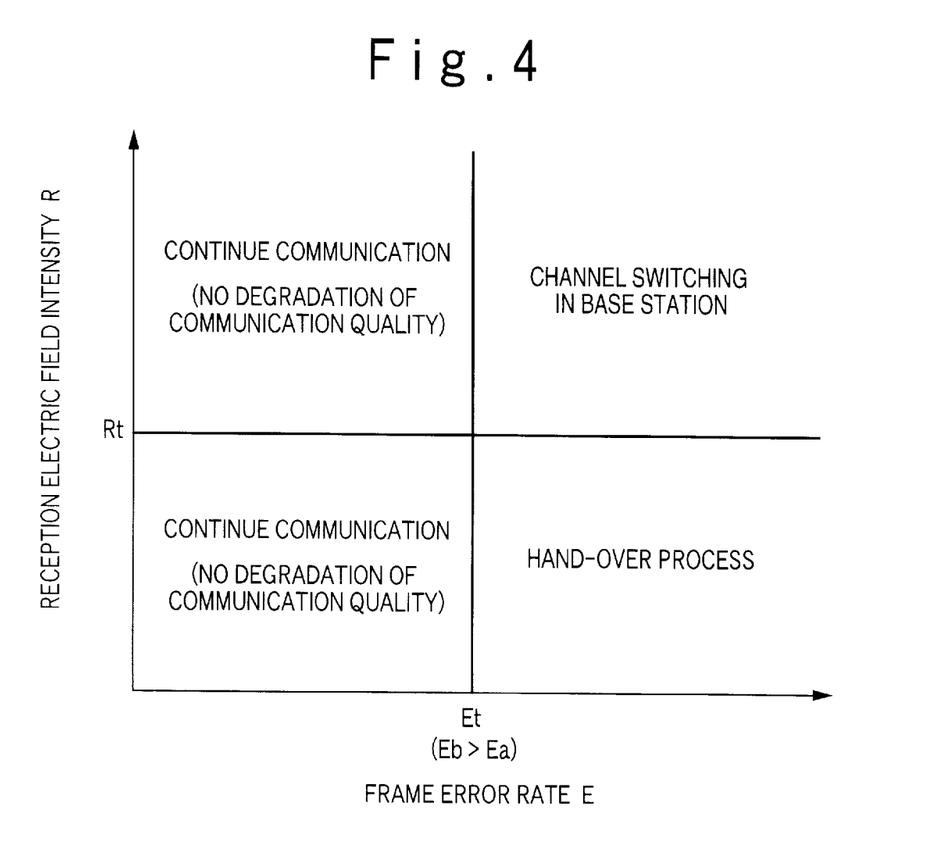
FIG. 4 is a diagram showing the operation of the mobile phone according to the first embodiment of the present invention.

When the report from the state monitoring section 6 indicates the frequent occurrence of the hand-over failure, the frame error rate threshold value Et is set as the threshold value Eb by the frame error rate threshold value setting section 5 (step A101 and step A102 of FIG. 3). In the channel switching determining section 4, the frame error rate E and the frame error rate threshold value Et are first compared with each other (Step A104). If the comparing result of step A104 indicates E≧Et, the communication quality degradation count Q is incremented to becomes Q=1 (Step A106).

Here, it is supposed that the communication quality degradation count threshold value Qt=N−3. By setting the channel switching restraint threshold value Eb as the frame error rate threshold value Et, the number of times determined as the communication quality degradation decreases, compared with the case of the usual use threshold value Ea. It is supposed that E≧Et1 is satisfied (N−4)times in the comparing result of the step A104 when the summing process is repeated N time. In this case, the communication quality degradation count Q=N−4. Because it becomes Q<Qt in the step A107, it is determined that there is not the degradation of the communication quality so that the channel switching operation becomes unnecessary. Then, the communication quality degradation count Q is cleared. Thus, the channel switching determining process is ended (Step A111). Thereafter, the channel switching method is executed by the channel switching executing section (not shown).

Next, the mobile phone according to the second embodiment of the present invention will be described in detail with reference to the drawings.

Figure 6:
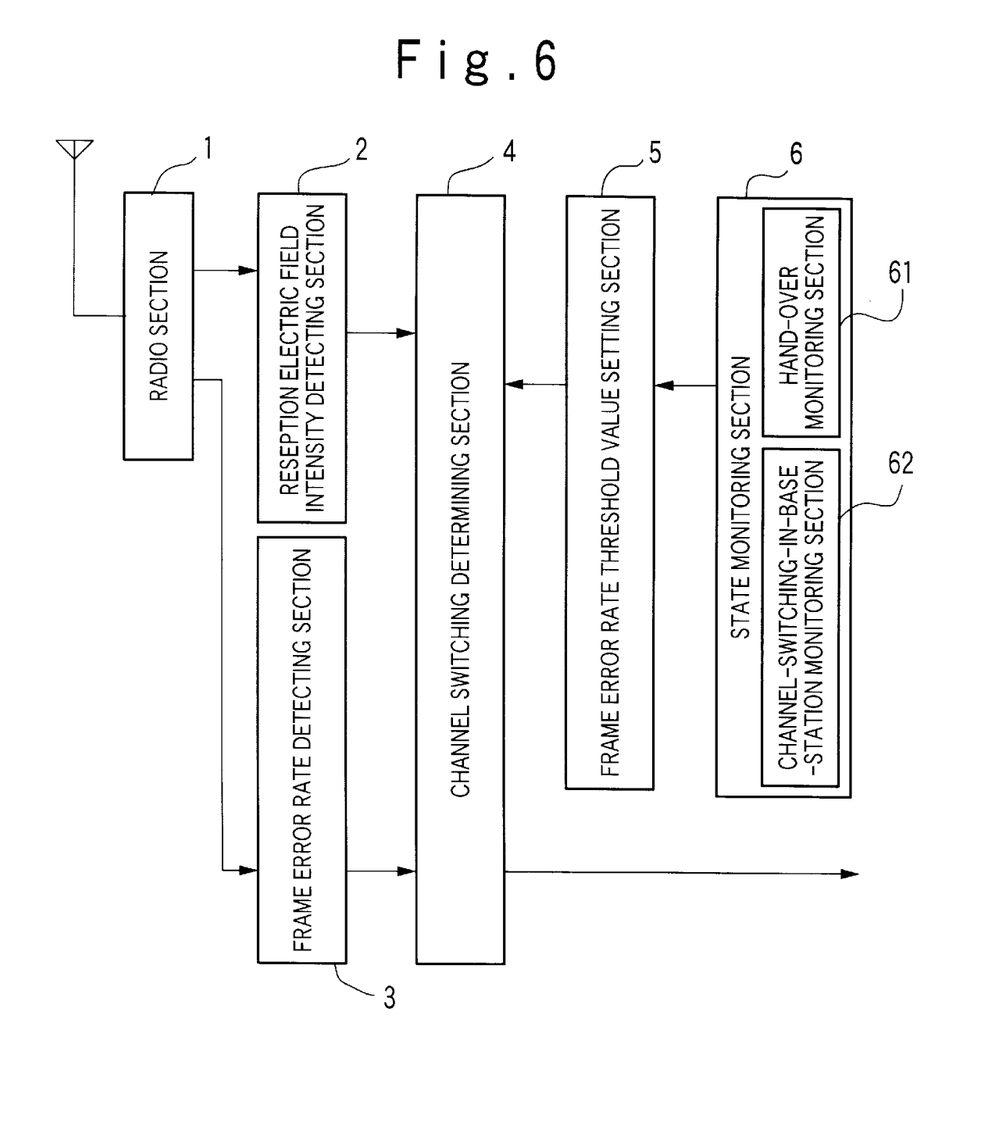
FIG. 6 is a block diagram showing the structure of the mobile phone according to a second embodiment of the present invention.

Referring to FIG. 6, the mobile station according to the second embodiment is different from the first embodiment shown in FIG. 2 in the following point. That is, the state monitoring section 6 monitors the result of the channel switching operation (inter-station channel switching operation) and is composed of a hand-over monitoring section 61 for monitoring the hand-over execution result and a channel-switching-in-base-station monitoring section 62 for monitoring the execution result of the channel switching operation in the base station (intra-station channel switching operation).

These methods are executed as follows, respectively.

Like the operation of the state monitoring section 6 of the first embodiment shown in FIG. 2, the hand-over monitoring section 61 measures the number of times of execution of the hand-over process as the communication channel switching method and the executing result every time the hand-over process is executed. Then, the hand-over monitoring section 61 calculates the hand-over success rate after a predetermined number of times of measurement and determines whether or not the hand-over occur frequently.

The channel-switching-in-base-station monitoring section 62 measures the number of times of execution of the channel switching in the base station and a communication channel establishment result every time the channel switching in the base station is executed. Then, the channel-switching-in-base-station monitoring section 62 calculates a communication channel establishment success rate after the predetermined number of times, and determines whether the channel switching state is good or bad, namely, whether or not the channel switching operation is successful.

Figure 7:
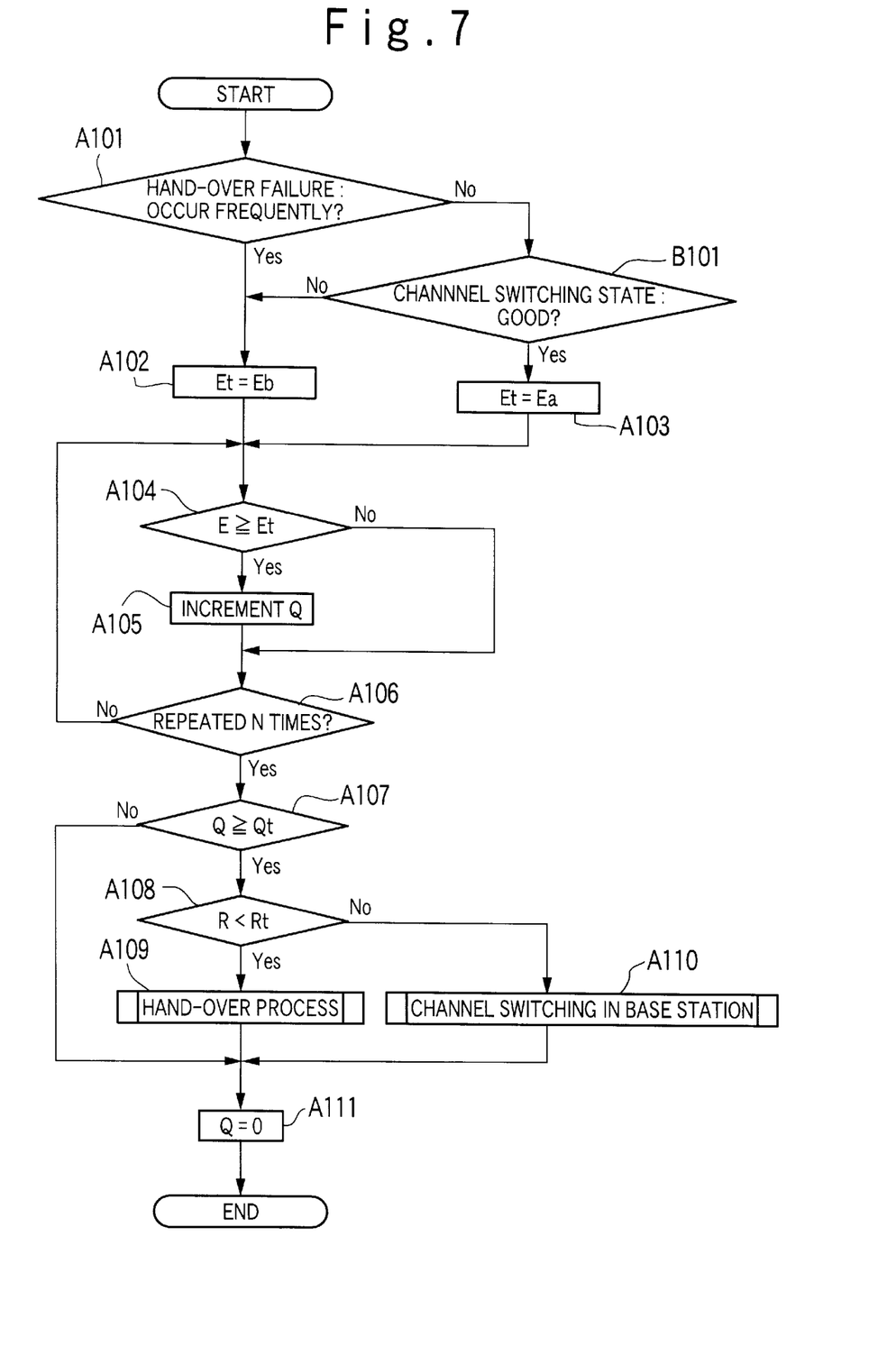
FIG. 7 is a flow chart showing the operation of the mobile phone according to the second embodiment of the present invention.

Next, the operation of the whole of the mobile phone according to the second embodiment will be described in detail with reference to the flow charts of FIG. 7 and FIG. 8. The operations of the channel switching determining section 4 shown in the steps A104 to A111 of FIG. 7 are the same as those of the channel switching determining section 4 according to the first embodiment shown in FIG. 2. Therefore, the description is omitted.

In the first embodiment shown in FIG. 2, the frame error rate threshold value is set based on only the determination result of whether the hand-over failure occurs frequently, reported from state monitoring section 6 (step A101). However, in the second embodiment, the determination result of the hand-over operation results in the past which is reported from the hand-over monitoring section 61 is first confirmed, like the first embodiment shown in FIG. 2 (Step A101).

The method (step A102) of setting the frame error rate threshold value when the hand-over failure occurs frequently is the same as that in the first embodiment shown in FIG. 2. However, when the hand-over failure does not occur frequently, the determination result of the operation results in the past of the channel switching in the base station which is reported from the channel-switching-in-base-station monitoring section 62 is confirmed (step B101 of FIG. 6).

In this case, if the channel switching state is good, the usual use threshold value Ea is set as the frame error rate threshold value Et, as in the first embodiment shown in FIG. 3 (Step A103). However, if the channel switching state is not good, the channel switching restraint threshold value Eb is set as the frame error rate threshold value Et, as in the case where the hand-over failure occurs frequently (Step A102).

In the second embodiment, in the case where the hand-over failure does not occur frequently in the step A101, whether the channel switching state is good or bad is further confirmed, and finally the frame error rate threshold value Et is set.

In the above-mentioned specific example shown in FIG. 4, the frame error rate threshold value Et is a threshold value set in such a manner that the channel switching in the base station or the hand-over is initiated as the channel switching operation when the frame error rate E is E≧Et. Therefore, in order to restrain all the channel switching operation, it is desirable to set the frame error rate threshold value Et, after the operation result of the channel switching in the base station is confirmed in addition to the hand-over operation result.

Next, a specific example will be described.

The operation of the hand-over monitoring section 61 is the same as the operation of the state monitoring section 6 in the first embodiment shown in FIG. 5. Therefore, the description is omitted.

Figure 8:
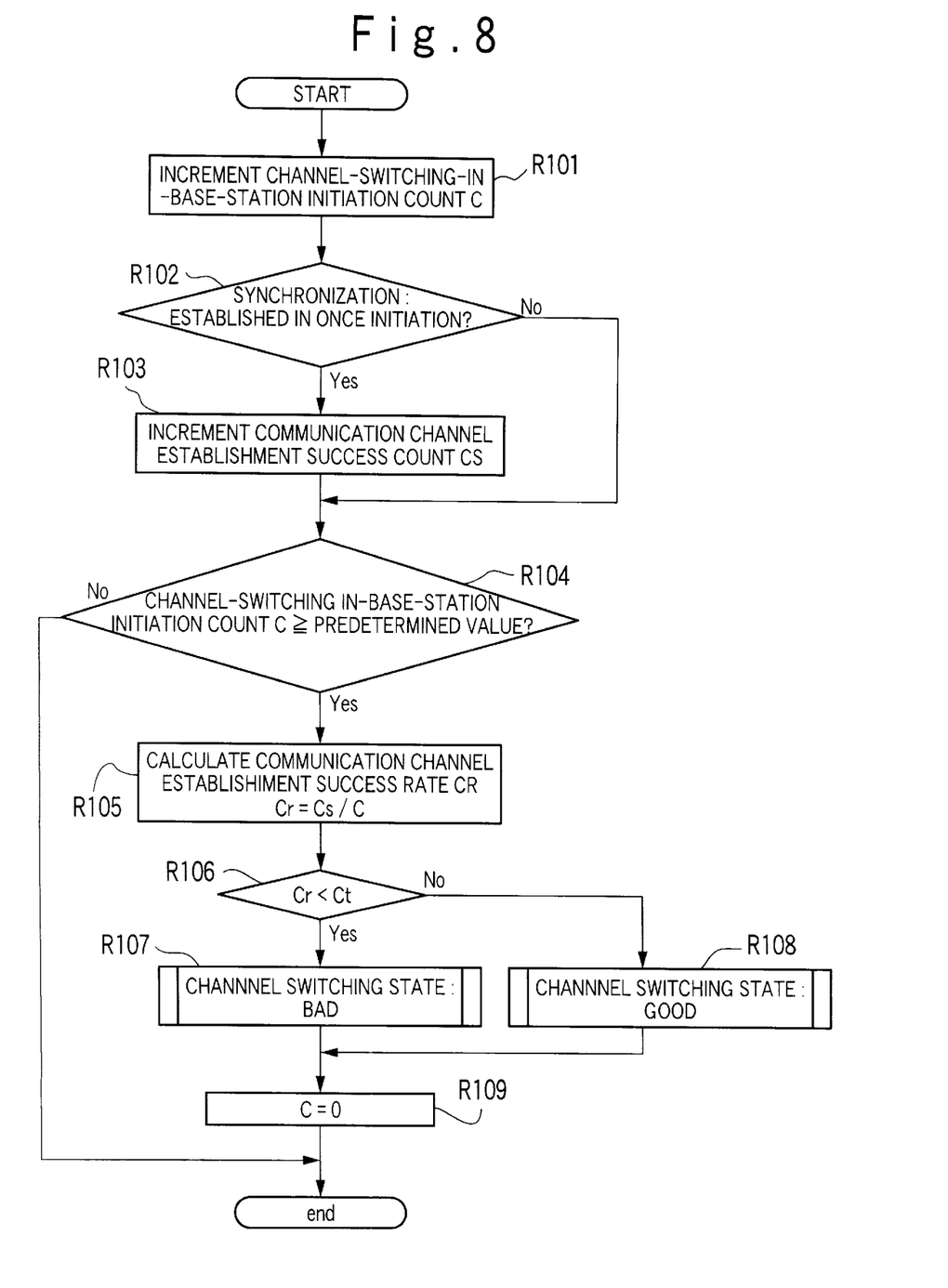
FIG. 8 is a flow chart showing a specific example of the operation of the mobile phone according to the second embodiment of the present invention.

The operation of the channel-switching-in-base-station monitoring section 62 is performed as shown in FIG. 8. That is, when the channel switching in the base station is executed as the channel switching method, the channel-switching-in-base-station initiation count C is first incremented (step R101 of FIG. 8).

Next, in order to measure the communication channel establishment result at the time of the channel switching in the base station, the result of the establishment of the destination communication channel at the time of the channel switching in the base station is confirmed (Step R102). When the establishment of the destination communication channel at the channel switching succeeds at once, the success of the communication channel establishment is determined so that the communication channel establishment success counter Cs is incremented (Step R103).

In the environment in which the interference wave is generated in an impulse manner, the establishment of the destination communication channel sometimes fails at the time of the channel switching in the base station. This is similar to the establishment of the synchronization at the time of the hand-over in the first embodiment shown in FIG. 5. Therefore, when the establishment of the destination communication channel can not be succeeded at once, it is determined that the establishment of the communication channel is failed due to the interference wave. Then, the communication channel establishment result measuring process is ended without incrementation of the communication channel establishment success count Cs.

The measuring process is executed every time the channel switching in the base station is executed. When the channel-switching-in-base-station initiation count C reaches a predetermined value (Step R104), the communication channel establishment success rate Cr(=Cs/C) is calculated (Step R105). Then, the communication channel establishment success rate Cr and the communication channel establishment success rate threshold value Ct are compared with each other (Step R106).

If Cr<Ct, it is determined that the channel switching state is not good (Step S107), because the communication channel establishment failure due to the influence of the interference wave occurs frequently at the time of the channel switching in the base station. Also, if Cr≧Ct, it is determined that the channel switching state is good (Step R108), because the communication channel establishment failure due to the influence of the interference wave does not occur frequently. Subsequently, the channel-switching-in-base-station initiation count C is cleared (Step R109).

When the report from the hand-over monitoring section 61 indicates that the hand-over operation does not occur frequently, or when the report from the channel-switching-in-base-station monitoring section 62 indicates that the channel switching state is not good, the usual use threshold value Eb is set as the frame error rate threshold value Et by the frame error rate threshold value setting section 5 (Step A101, step B101 and step A102 of FIG. 7).

After the summing process in the channel switching determining section 4 shown in the steps A104 to A106 is repeated N times, the channel switching restraint threshold value is set as the frame error rate threshold value Et. Thus, all the comparing results of step A104 become E<Et. At this time, the communication quality degradation count Q becomes 0 so that it becomes Q<Qt (Step A108). Because there is no degradation of the communication quality, the selection of the channel switching method is not performed and the channel switching determining process is ended.

The effect of the present invention is in that unnecessary channel switching operation due to the influence of the interference wave is restrained so that stable communication can be continued, in the environment in which the interference wave which causes the communication channel quality degradation, especially an impulse interference wave is frequently generated.

The influence of the interference wave at the time of the channel switching operation is determined from the results of the channel switching in the past. Also, the communication quality degradation detection condition is set based on the determining result to restrain the unnecessary channel switching operation in which the possibility of failure due to the influence of the interference wave is high.

What is claimed is:

1. A mobile phone comprising:

an error detecting section detecting a frame error rate on a present communication of one of a plurality of base stations; and a channel switching control section determining whether a communication quality is degraded, based on said detected frame error rate and a past channel switching result, and determining that a channel switching from said present communication channel to a new communication channel should be performed, when it is determined that the communication quality is degraded.

2. A mobile phone according to claim 1, wherein said channel switching control section determines a frame error rate threshold value based on said past channel switching result, compares said detected frame error rate and said determined frame error rate threshold value, and determines that the communication quality is degraded when said detected frame error rate is equal to or larger than said determined frame error rate threshold value.

3. A mobile phone according to claim 2, wherein said channel switching control section sets a first threshold value as said determined frame error rate threshold value when said past channel switching result indicates that a success rate of past channel switching operations is equal to or higher than a success rate threshold value, and a second threshold value as said determined frame error rate threshold value when said past channel switching result indicates that said past channel switching result indicates that said success rate of said past channel switching operations is lower than said success rate threshold value, said second threshold value being larger than said first threshold value.

4. A mobile phone according to claim 3, wherein said past channel switching operations are hand-over operations.

5. A mobile phone according to claim 3, wherein said past channel switching operations are intra-station channel switching operations.

6. A mobile phone according to claim 3, wherein said channel switching control section calculates said success rate of said past channel switching operations when said past channel switching operation is executed a predetermined number of times.

7. A mobile phone according to claim 2, wherein said channel switching control section sets one of first and second threshold values as said determined frame error rate threshold value based on said past channel switching result, said second threshold value being larger than said first threshold value.

8. A mobile phone according to claim 7, wherein said past channel switching result includes a first success rate of hand-over operations and a second success rate of intra-station channel switching operations, and wherein said second threshold value is set when said first success rate is lower than a first success rate threshold value, or when said first success rate is equal to or higher than said first success rate threshold value but said second success rate is lower than a second success rate threshold value, and said first threshold value is set when said second success rate is equal to or higher than said second success rate threshold value.

9. A mobile phone according to claim 8, wherein said channel switching control section calculates said first success rate when a hand-over operation is executed a first predetermined number of times, and said second success rate when an intra-station channel switching operation is executed a second predetermined number of times.

10. A mobile phone according to claim 1, further comprising an intensity detecting section detecting reception electric field intensities from signals received from said plurality of base stations, and wherein said channel switching control section determines whether a hand-over process or an intra-station channel switching operation should be performed, based on the detected reception electric field intensities, when it is determined that said channel switching should be performed.

11. A mobile phone according to claim 1, further comprising an intensity detecting section detecting reception electric field intensities from signals received from said plurality of base stations, and wherein said channel switching control section includes:
a channel switching determining section determining whether the communication quality is degraded, based on said detected frame error rate and a frame error rate threshold value, and determining that said channel switching from said present communication channel to said new communication channel should be performed based on a channel switching method, when it is determined that the communication quality is degraded;
a setting section selecting one of a first threshold value and a second threshold value as said frame error rate threshold value in response to said past channel switching result to set to said channel switching determining section, said first threshold value being smaller than said second threshold value; and
a state monitoring section monitoring results of past channel switching operations to output said past channel switching result to said setting section.

12. A mobile phone according to claim 11, wherein said channel switching determining section determines that the communication quality is degraded, when said detected frame error rate is equal to or larger than said frame error rate threshold value, and determines which of a hand-over process or an intra-station channel switching process should be performed, based on said detected reception electric field intensities, when it is determined that the communication quality is degraded.

13. A mobile phone according to claim 11, wherein said state monitoring section monitors a success rate of said hand-over processes, determines whether a hand-over failure does not occur frequently, based on said hand-over success rate and a success rate threshold value, and outputs said past channel switching result to said setting section based on the determining result of whether a hand-over failure does not occur frequently.

14. A mobile phone according to claim 13, wherein said setting section selects said second threshold value as said frame error rate threshold value, when it is determined by said state monitoring section that said hand-over failure occurs frequently, and said first threshold value as said frame error rate threshold value, when it is determined by said state monitoring section that said hand-over failure does not occurs frequently.

15. A mobile phone according to claim 14, wherein said second threshold value is set to a value in a range with an upper limit value such that a communication can be performed on said present communication channel at least.

16. A mobile phone according to claim 13, wherein said state monitoring section sets said success rate of said hand-over processes is increased, when synchronization with a destination one of said plurality of base stations is established at once hand-over process.

17. A mobile phone according to claim 12, wherein said state monitoring section includes:
a hand-over monitoring section monitoring an execution result of said hand-over process; and
an intra-station channel switching monitoring section monitoring an execution result of said intra-station channel switching process, and wherein said state monitoring section outputs at least one of said execution result of said hand-over process and execution result of said intra-station channel switching as said past channel switching result.

18. A mobile phone according to claim 17, wherein said hand-over monitoring section monitors a number of times of execution of said hand-over process and the execution result of said hand-over process, calculates said success rate of said hand-over processes after a predetermined number of times of the execution of said hand-over process, and determines whether or not the hand-over process occurs frequently.

19. A mobile phone according to claim 17, wherein said intra-station channel switching monitoring section monitors a number of times of execution of said intra-station channel switching process and a communication channel establishment result in said intra-station channel switching process, calculates a communication channel establishment success rate after a predetermined number of times of the execution of said intra-station channel switching process, and determines whether or not said communication channel is successfully established.

* * * * *